June 13, 1950     E. M. TUCKER ET AL     2,511,025
FIXED WING AIRCRAFT CONVERTIBLE
TO A ROTARY WING AIRCRAFT
Filed Jan. 21, 1947     2 Sheets-Sheet 2
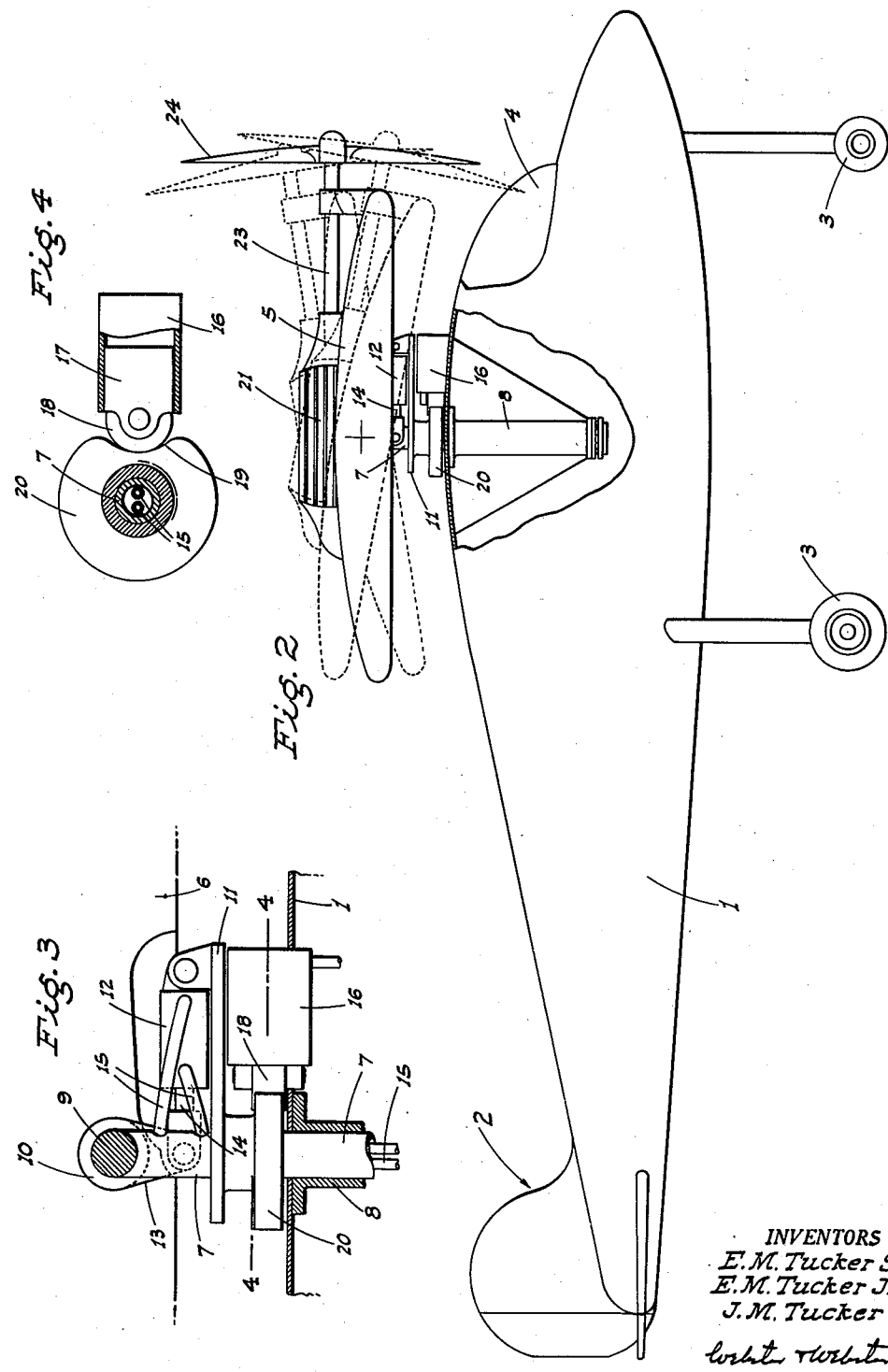
INVENTORS
E. M. Tucker Sr.
E. M. Tucker Jr.
J. M. Tucker
ATTYS

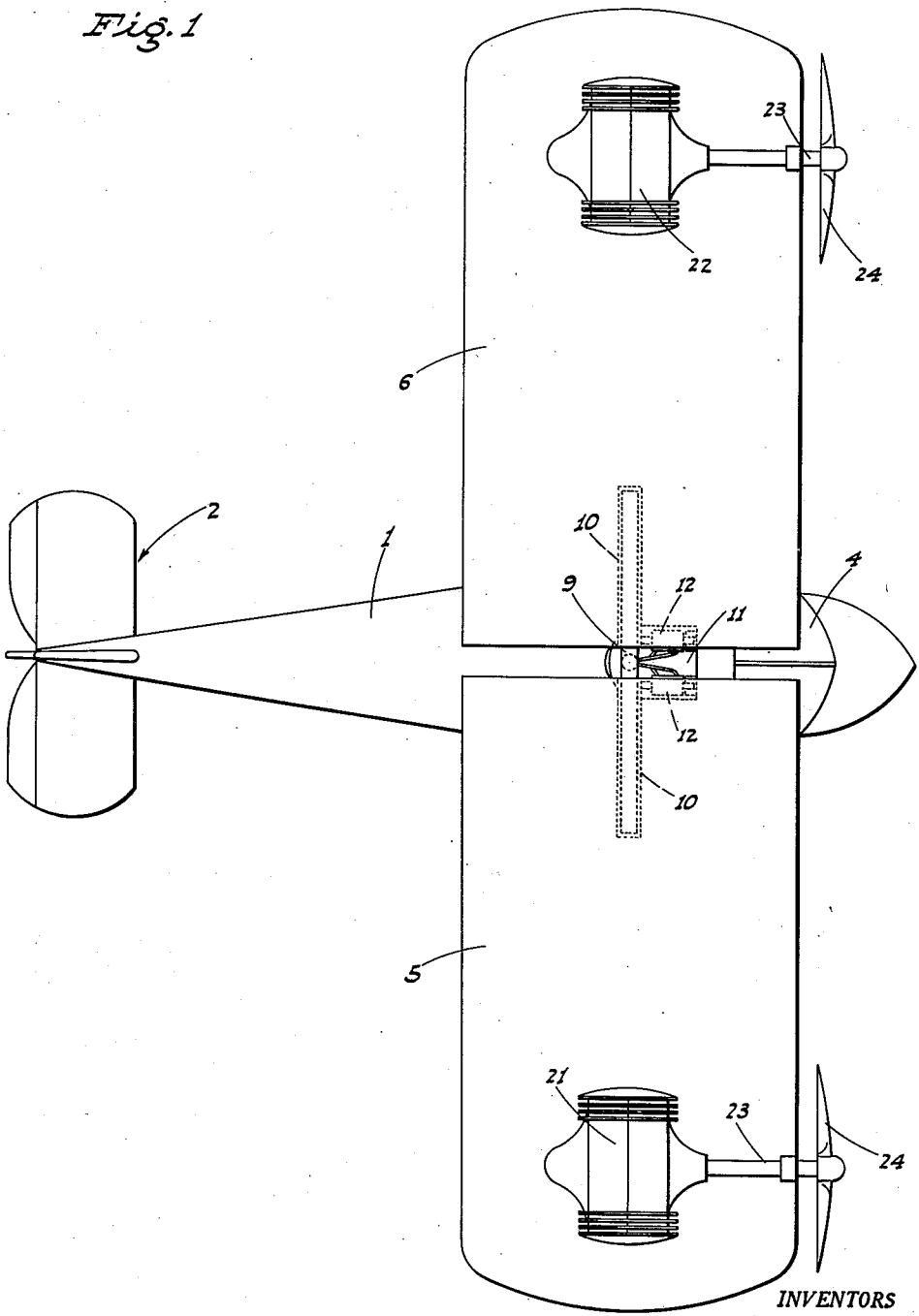

UNITED STATES PATENT OFFICE 2,511,025

FIXED WING AIRCRAFT CONVERTIBLE TO A ROTARY WING AIRCRAFT

Emmitt M. Tucker, Joseph M. Tucker, and Emmitt M. Tucker, Jr., Medford, Oreg., assignors to Tucker & Sons, Grass Valley, Calif., a corporation of California Application January 21, 1947, Serial No. 723,242

6 Claims. (Cl. 244—7)

This invention relates to, and it is an object to provide, an airplane including a novel wing and engine assembly arranged for adjustment so that for take-offs and landings the airplane may function as a helicopter with revolving wings, but for flight has the wings set in conventional fixed position projecting laterally from opposite sides of the fuselage.

Another object of the invention is to provide an airplane, of the type described, wherein the wing sections are arranged for adjustment in a manner to vary the angle of incidence, or reverse the same, at the will of the pilot whereby the airplane can be operated for conventional flight or as a helicopter; said wing sections being rigid for conventional flight and rotatable as a unit for helicopter flight, selectively.

A further object of the invention is to provide an airplane, as above, wherein each wing section, adjacent its outer end, carries a motor having a propeller thereon; the propellers being of reversible pitch type whereby for conventional flight both propellers are set with like pitch, but for helicopter flight, with the wing section assembly rotating, the pitch of one propeller only is reversed.

A further object of the invention is to provide a practical airplane, and one which will be exceedingly effective for the purpose for which it is designed.

These objects are accomplished by means of such structure and relative arrangement of parts as will fully appear by a perusal of the following specification and claims.

In the drawings:

Fig. 1 is a plan view of an airplane embodying the present invention.

Fig. 2 is a side elevation of the same with the fuselage partly broken away.

Fig. 3 is an enlarged fragmentary elevation of the mounting and control mechanism for the wing section assembly.

Fig. 4 is a cross section on line 4—4 of Fig. 3.

Referring now more particularly to the characters of reference on the drawings, the airplane includes a fuselage 1 having a tail assembly 2 and landing wheels 3 associated therewith, the pilot's compartment being indicated generally at 4.

The wing assembly of the airplane comprises a pair of oppositely projecting wing sections 5 and 6 initially separate from each other and from the fuselage 1, being disposed in a plane above the latter.

The wing sections 5 and 6 are mounted in connection with the fuselage 1 in the following manner:

A tubular mounting post 7 is rotatably mounted in an upstanding bearing 8 fixed within the fuselage at and depending from the top adjacent the pilot's compartment. The post 7 projects upwardly above the bearing 8 and fuselage 1, and at its upper end said post is fitted with rigid oppositely projecting spindles 9. The wing sections 5 and 6 have sleeves 10 fixed therein at their adjacent end portions and extending lengthwise of said sections; the sleeves surrounding the spindles 9 in relatively rotatable but axially immovable relation.

Below the spindles 9 the post 7 includes a platform 11 fixed therewith; there being a pair of power units 12, such as fluid pressure actuated power cylinders, mounted on the platform 11 directly ahead of the sleeves, the latter including depending radial arms 13 pivotally connected to the actuating rod 14 of the corresponding power unit 12.

The power units 12 are selectively operable by the pilot through the medium of a control system, shown only in part as at 15, whereby to adjust or vary the angle of incidence of the wing sections 5 and 6, or to reverse such angle of incidence of the wing sections relative to each other, at the selection of the pilot.

While the post 7 is rotatably mounted in the bearing 8, it may be locked up against rotation with the wing sections 5 projecting laterally in opposite directions from the fuselage 1 by means of a power unit 16, such as a fluid pressure actuated power cylinder, mounted on the fuselage 1 directly ahead of the post 7 but below the platform 11.

The power unit 16 includes a plunger 17 having a roller 18 on its outer end adapted to lockingly engage in a depression 19 of a locking cam 20 on said post 7. It will be seen that when the plunger 17 is advanced with the roller 18 in depression 19 of cam 20, the post 7 cannot rotate; the wing sections 5 and 6 then being disposed in a manner for conventional flight.

For helicopter flight the plunger 17 and roller 18 are retracted, permitting of free rotation of the post 7 and the wing sections 5 and 6 therewith as a rotative assembly.

The wing sections 5 and 6 are fitted, adjacent their outer ends, with airplane engines, indicated generally at 21 and 22, each engine including a projecting shaft 23 having a reversible pitch propeller 24 thereon.

For conventional flight the post 7 is locked by the power unit 16 against rotation, and the wing sections 5 and 6 are set, by the power units 12, with the same angle of incidence. Similarly, for conventional flight, the reversible pitch propellers 24 are set with like pitch. With the parts so arranged the airplane functions in the usual manner.

For helicopter type flight the post 7 is released for rotation, and the wing sections 5 and 6 are adjusted, by the power units 12, with reverse angle of incidence, whereby upon rotation of the wing section assembly each wing section imparts lift to the airplane, even though said wing sections are rotating 180 degrees apart. When the airplane is used as a helicopter one propeller 24 is set with reverse pitch so that they both tend to rotate the wing section assembly.

It is intended for take-offs and landings that the airplane will be set for flight as a helicopter, while flight otherwise will be as a conventional airplane.

The air foil of the wing sections 5 and 6 is the same adjacent the opposite edges of the wing sections so that the latter may function correctly whether set with opposed angle of incidence as for helicopter flight, or with the same angle of incidence as for conventional flight.

The engines 21 and 22, together with their reversible pitch propellers, are regulated or controlled by the pilot from the compartment 4 by control mechanisms of generally conventional type (not shown).

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. An airplane comprising, with a fuselage, a pair of wing sections disposed in adjacent end to end relation, an upstanding post, a bearing on the fuselage intermediate its ends in which the post is turnable, releasable means to lock the post against rotation, spindles projecting laterally in opposite directions from the post outside the fuselage, sleeves turnably but axially immovably secured on the spindles, the wing sections being fixedly attached longitudinally to corresponding sleeves, means adjustably securing the sleeves against rotation whereby the wing sections may be set with the same or opposed angle of incidence, and engine and propeller units mounted on the wing sections, at least one of the propellers being of reversible pitch type.

2. An airplane comprising, with a fuselage, a pair of wing sections disposed in adjacent end to end relation, an upstanding post, a bearing on the fuselage intermediate its ends in which the post is turnable, releasable means to lock the post against rotation, spindles projecting laterally in opposite directions from the post outside the fuselage, sleeves turnably but axially immovably secured on the spindles, the wing sections being fixedly attached longitudinally to corresponding sleeves, means adjustably securing the sleeves against rotation whereby the wing sections may be set with the same or opposed angle of incidence, and engine and propeller units mounted on the wing sections, at least one of the propellers being of reversible pitch type; said locking means being a notched cam on the post, and a power unit on the fuselage including a plunger adapted to project into the cam notch.

3. An airplane comprising, with a fuselage, a pair of wing sections disposed in adjacent end to end relation; an upstanding post, a bearing on the fuselage intermediate its ends in which the post is turnable, releasable means to lock the post against rotation, spindles projecting laterally in opposite directions from the post outside the fuselage, sleeves turnably but axially immovably secured on the spindles, the wing sections being fixedly attached longitudinally to corresponding sleeves, means adjustably securing the sleeves against rotation whereby the wing sections may be set with the same or opposed angle of incidence, and engine and propeller units mounted on the wing sections, at least one of the propellers being of reversible pitch type; said last named means including radial arms on the sleeves, and power units connected to said arms in operative relation but normally holding the same against motion.

4. An airplane comprising in combination; a fuselage, an upstanding rotatable post secured in the fuselage, a pair of oppositely projecting spindles fixed to the post adjacent its upper end, a sleeve turnably mounted on each spindle and held against axial movement relative thereto, a wing section fixedly attached to each sleeve, an arm projecting radially from each sleeve, a rod connected to the outer end of each arm, power means connected with each rod and operative to selectively move the rod in one direction or the other, locking means operative to selectively lock the post against rotation or to release it for rotation, and an engine and propeller unit mounted on each wing, at least one of the propellers being of the reversible pitch type.

5. A combination as in claim 4 in which said power means comprises a platform fixed to the post, a pair of fluid pressure operated power cylinders mounted on the platform, each power cylinder being operatively connected with one of the rods.

6. A combination as in claim 4, in which the locking means comprises a cam fixed to the post and provided with a depression, a fluid pressure operated ram mounted on the fuselage, and a roller on the ram engageable with the depression in the cam upon operation of the ram.

EMMITT M. TUCKER.
JOSEPH M. TUCKER.
EMMITT M. TUCKER, JR.

REFERENCES CITED

The following references are of record in the file of this patent:

UNITED STATES PATENTS

| Number | Name | Date |
|---|---|---|
| 1,545,198 | Rietti | July 7, 1925 |
| 1,557,789 | Bane | Oct. 20, 1925 |
| 1,609,002 | Severson | Nov. 30, 1926 |
| 1,688,186 | Humphreys | Oct. 16, 1928 |
| 1,848,321 | Cresci | Mar. 8, 1932 |
| 2,254,963 | Hovland | Sept. 2, 1941 |